US012023612B2

(12) United States Patent
Schouweiler et al.

(10) Patent No.: US 12,023,612 B2
(45) Date of Patent: *Jul. 2, 2024

(54) FILTRATION MEDIA

(71) Applicants: AHLSTROM-MUNKSJÖ OYJ, Helsinki (FI); DONALDSON COMPANY, INC., Bloomington, MN (US)

(72) Inventors: Kevin R. Schouweiler, Brentwood, TN (US); Kent Williamson, Madisonville, KY (US); Kristin Amsden, Bloomington, MN (US); Steven D. Schmeichel, Bloomington, MN (US)

(73) Assignees: AHLSTROM OYJ, Helsinki (FI); DONALDSON COMPANY, INC., Minneapolis, MN (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/532,230

(22) Filed: Nov. 22, 2021

(65) Prior Publication Data
US 2022/0080340 A1   Mar. 17, 2022

Related U.S. Application Data

(63) Continuation of application No. 16/261,244, filed on Jan. 29, 2019, now Pat. No. 11,185,806, which is a continuation of application No. 14/774,903, filed as application No. PCT/FI2014/050193 on Mar. 14, 2014, now Pat. No. 10,195,555, which is a continuation of application No. 13/829,572, filed on Mar. 14, 2013, now abandoned.

(51) Int. Cl.
*B01D 39/16* (2006.01)
*B01D 39/18* (2006.01)
*D04H 3/00* (2012.01)
*D04H 5/04* (2006.01)

(52) U.S. Cl.
CPC ..... *B01D 39/1615* (2013.01); *B01D 39/1607* (2013.01); *B01D 39/1623* (2013.01); *B01D 39/163* (2013.01); *B01D 39/18* (2013.01); *B01D 2239/064* (2013.01); *B01D 2239/069* (2013.01); *B01D 2239/086* (2013.01); *B01D 2239/1216* (2013.01); *B01D 2239/1225* (2013.01); *B01D 2239/1233* (2013.01); *B01D 2239/1258* (2013.01); *B01D 2239/1291* (2013.01); *D04H 3/00* (2013.01); *D04H 5/04* (2013.01)

(58) Field of Classification Search
None
See application file for complete search history.

(56) References Cited

U.S. PATENT DOCUMENTS

| | | | |
|---|---|---|---|
| 2,539,378 A | 1/1951 | Stootman | |
| 4,241,122 A | 12/1980 | Asano | |
| 4,431,479 A | 2/1984 | Barbe | |
| 4,455,195 A | 6/1984 | Kinsley | |
| 4,455,237 A | 6/1984 | Kinsley | |
| 5,914,157 A | 6/1999 | Munson et al. | |
| 6,133,170 A | 10/2000 | Suenaga | |
| 7,270,692 B2 | 9/2007 | Gillingham et al. | |
| 7,303,604 B2 | 12/2007 | Gieseke et al. | |
| 7,488,365 B2 | 2/2009 | Golden et al. | |
| 7,959,702 B2 | 6/2011 | Rocklitz et al. | |
| 8,236,082 B2 | 8/2012 | Witsch et al. | |
| 8,241,383 B2 | 8/2012 | Schrage et al. | |
| 2001/0024716 A1 | 9/2001 | Chen | |
| 2004/0221976 A1 | 11/2004 | Williams | |
| 2006/0196359 A1 | 9/2006 | Gillingham et al. | |
| 2008/0022645 A1 | 1/2008 | Skirius et al. | |
| 2009/0077938 A1 | 3/2009 | Kume et al. | |
| 2010/0031618 A1* | 2/2010 | Grove, III | B01D 39/163 162/123 |
| 2010/0181015 A1 | 7/2010 | Kohler | |
| 2010/0314333 A1 | 12/2010 | Witsch et al. | |
| 2010/0319543 A1* | 12/2010 | Witsch | B01D 46/2484 162/100 |

(Continued)

FOREIGN PATENT DOCUMENTS

| | | |
|---|---|---|
| CN | 1615172 A | 5/2005 |
| CN | 1809408 A | 7/2006 |
| CN | 102458604 A | 5/2012 |

(Continued)

OTHER PUBLICATIONS

PCT International Preliminary Report on Patentability for PCT/US2014/029179, dated Sep. 15, 2015.
First Search Report from State Intellectual Property Office of People's Republic China in Application No. 201480014933.4 of Ahlstrom Corporation, dated Mar. 23, 2016.
Office Action in U.S. Appl. No. 14/774,804, dated Nov. 22, 2017.
Notice of Grounds for Rejection from the Korean Intellectual Property Office in Application No. 2015-7028234 of Ahlstrom Corporation, dated May 16, 2016.

(Continued)

*Primary Examiner* — Clare M Perrin
(74) *Attorney, Agent, or Firm* — CANTOR COLBURN LLP

(57) ABSTRACT

A filtration media with improved filtration, strength, tear resistance and air permeability in the form of a relatively thin and lightweight wet-laid fibrous web that has a wet Mullen ratio of 60% to 80% to ensure that the media is flexible enough to be formed into a fluted structure, and strong enough to retain the fluted structure when wound into a roll and to permit further processing without the media becoming too brittle. The filtration media comprises a blend of cellulose and synthetic fibers having a weight percent of 81 wt % to 87 wt % of a weight of the media and a resin binder having a weight of 13 wt % to 19 wt % (preferably about 16 wt %) of the weight of the media.

16 Claims, No Drawings

(56) References Cited

U.S. PATENT DOCUMENTS

2012/0196733 A1    8/2012   Moe et al.

FOREIGN PATENT DOCUMENTS

| CN | 102458606 A | 5/2012 |
|---|---|---|
| EP | 1733776 A2 | 12/2006 |
| EP | 2528675 A1 | 12/2012 |
| JP | 2012036518 | 2/2012 |
| KR | 1099377 | 12/2011 |
| KR | 20120044979 | 5/2012 |
| WO | 2009003119 | 12/2008 |
| WO | 2014144670 | 9/2014 |

OTHER PUBLICATIONS

Communication pursuant to Rule 164(2)(b) and Article 94(3) EPC in European Patent Application No. 14 718 869.2 of the Donaldson Company, Inc., including Search Results and examination report, dated Nov. 7, 2019.
Non-Final Office Action dated Nov. 24, 2014 in U.S. Appl. No. 13/839,915.
PCT International Search Report and Written Opinion for PCT/US2014/029179, dated Oct. 13, 2014.
PCT International Search Report for PCT/FI2014/050191, dated Jul. 3, 2014.
Buckeye Product Summary, Grade FHP-11 Sbsk Wood Pulp, Mar. 8, 2013, Buckeye Technologies, Memphis, TN.
PCT International Preliminary Report on Patentability for PCT/FI2014/050193, dated May 8, 2015.
Mohamed, M et al., "Efficient Use of Fibrous Structures in Filtration", Industrial Environmental Research Laboratory, U.S. Environment Protection Agency, Research Triangle Park, NC, EPA-600/2-76-204, Jul. 1976.
PCT International Preliminary Report on Patentability for PCT/FI20141/050191, dated Jul. 1, 2015.
Final Office Action dated Aug. 13, 2015 in U.S. Appl. No. 13/839,915.

\* cited by examiner

FILTRATION MEDIA

TECHNICAL FIELD

This disclosure relates generally to filtration and, more particularly, to filtration media for use in filter elements, packs or cartridges designed to remove contaminant materials from fluid streams, such as air and liquid, and methods of making such filtration media.

BACKGROUND

It is quite common for fluid streams, such as air flow streams, gas streams and liquid streams, to carry contaminant materials therein. For example, fluid streams to engines, gas turbines, combustion furnaces, engine lube systems, hydraulic systems, coolant systems and fuel systems carry particulate contaminants therein that should be filtered.

Filtration media of various fiber compositions and processing methods are currently available for removing some or all contaminant materials from such fluid streams. The media are typically porous to permit fluid to flow through the media while at the same time trapping particulate contaminants in the media. In particular, a wide range of media have been developed for use in pleated filter elements, which expand the effective surface area of the media that can trap contaminant material. In addition to good particulate contaminant removal properties, suitable pleated filter media often have high strength, and preserve (or substantially preserve) the media's pleats during manufacture, storage and use.

In recent years, alternatives to pleated configurations have been developed, which incorporate a series of fluted sheets of media through which fluid flows from one flute to another as it passes from an upstream ("dirty") side of the filter element to a downstream ("clean") side of the filter element. This flow is often called "z-flow", and filters with fluted media are sometimes referred to as a "z-flow element". Example z-flow elements are disclosed in U.S. Pat. No. 8,241,383, assigned to Donaldson Company, Inc. In some z-flow constructions, the flutes are characterized by unique shapes that contain features such as sharp flute peaks and/or ridges formed in the fluted media between adjacent flute peaks.

Although media having structured flutes is desirable for many applications, much of the existing air filtration media can be difficult to form into structured flutes, and can become degraded (such as from tearing) during use as a result of vibrations, or the peaks and ridges (or other structures) in the flutes can fail to adequately retain their shape after forming and/or during use of the media.

Therefore, a need exists for improved filtration media which can be readily formed into structured flutes without cracking or tearing, which provides a desirable level of retention of flute shapes during storage and use, and is otherwise suitable for use in filtration applications that desire media constructions having flutes with sharp peaks and ridges between peaks, as well as other formed structural elements.

SUMMARY

The foregoing purposes, as well as others that will be apparent, are achieved generally by providing a thin and lightweight filtration media in the form of a wet-laid fibrous web that has a wet Mullen Ratio (as defined herein) of 60% to 80%, preferably 60% to 75% and more preferably 60% to 70%, to ensure that the media is flexible but strong enough to retain a fluted structure when wound into a roll and to permit further processing without the media becoming too brittle. The media has a total weight of about 31 to 49 pounds/3000 square feet (50-79 g/m$^2$), preferably 35 to 45 pounds/3000 square feet (57-73 g/m$^2$), a tear resistance of at least 50 grams (590 mN) per 16 ply in the machine direction and at least 60 grams (590 mN) per 16 ply in the cross direction, and should be sufficiently porous to allow the appropriate permeability to fluids while maintaining resistance to undesirable contaminants.

Filtration media that achieve the foregoing properties comprise a blend of fibers having a weight percent of 81 wt % to 87 wt % of the weight of the media and a resin binder preferably comprising a phenolic resin binder with a cross-linking agent and having a weight percent of 13 wt % to 19 wt % of the weight of the media. The blend of fibers comprises cellulose fibers having a weight percent of about 82.5 wt % to about 96 wt % of the weight of the blend of fibers and synthetic fibers having a weight percent of about 4 wt % to about 17.5 wt % of the weight of the blend of fibers. The cellulose fiber component of the blend of fibers comprises softwood pulp in the amount of about 32 wt % to about 66 wt % by weight of the media, the softwood pulp being of a type that when formed into a 60 pounds per 3,000 square feet (98 g/m$^2$) handsheet with a caliper of less than 26 mils (0.66 mm), preferably less than 23 mils (0.58 mm), the handsheet has an air permeability of 100-175 cfm (508-889 l/m$^2$ s). It is preferred that the handsheet has a minimum caliper of 16 mils (0.41 mm). The cellulose fiber component of the blend of fibers further comprises hardwood pulp having a weight percent of about 13 wt % to about 41 wt % of the media. The synthetic fibers are preferably polyester fibers having a denier of 1 to 3 and a length of ¼ to ½ inch (6.35-12.7 mm).

The filtration media can be produced with conventional wet-laid papermaking equipment having an inclined wire, flat fourdrinier wire or rotoformer to dewater a fiber slurry and form a wet web, and additional processing including heating, cooling, application of the resin binder, curing and wetting.

Additional fibers and materials may be added to the media or substituted for the fibers and materials disclosed above to impart other properties. Other objects, features and advantages of the present disclosure will be apparent when the detailed description of preferred embodiments is considered.

DETAILED DESCRIPTION OF PREFERRED EMBODIMENTS

The filtration media described herein exhibits the desired characteristics of improved filtration, strength, tear resistance and air permeability in the form of a relatively thin and lightweight wet-laid fibrous web that has a wet Mullen ratio of 60% to 80%, preferably 60% to 75% and more preferably 60% to 70%, to ensure that the media is flexible enough to be formed into a fluted structure, and strong enough to retain the fluted structure when wound into a roll and to permit further processing. The filtration media may therefore be used in a wide variety of filtration elements, including z-flow elements that require fluted media and laminar flow filter elements, and any other application that requires a thin, partially cured media.

The term "wet Mullen ratio" is used to indicate the acceptable curing level of the media that is needed to maintain the shape of a fluted or corrugated or pleated structure, and still have the flexibility to be further wrapped around a core and assembled into a filter element or cartridge. The wet Mullen ratio of the media formed by the present disclosure (which is partially cured to a desired state of cure less than full cure) is calculated by dividing the wet bursting strength of a sample of the partially cured media as formed by the wet bursting strength of a sample of the media that has been fully cured in an oven for 5 minutes at 350° F. (177° C.), and then multiplying by 100 to determine a percentage. The fully cured sample of the filtration media will exhibit the highest wet Mullen burst strength that the sample is capable of exhibiting.

Wet Mullen burst strength indicates the pressure required for puncturing a fiber web and the web's capacity for load carrying. In this test, samples are cut to at least 2.5×. 2.5 inches (64×64 mm), saturated with water having a concentration of non-ionic surfactant in the amount of approximately 0.03%, clamped into a circular diaphragm of a Mullen Bursting tester and the wet bursting strength is measured according to the Technical Association of the Pulp and Paper Industry ("TAPPI") Standard T 403 om-02 ("Bursting Strength of Paper").

It is desired that filtration media produced in accordance with this disclosure have a wet Mullen ratio between about 60% and 80%, preferably between 60% and 75%, and more preferably between 60% and 70%. It has been found that the stiffness of media having wet Mullen ratios lower than 60% is too low, and therefore not capable of retaining a fluted or corrugated or pleated structure. It has been further determined that when the wet Mullen ratio is higher than about 75%, the media may become too brittle, such that proper fluted or corrugated or pleated structures cannot be made without cracking and/or tearing media. The processing parameters and media composition described below are selected to achieve the desired state of cure in the media, as determined by the wet Mullen ratio.

The filtration media is constructed to be relatively thin, to permit dense packing within filtration elements and desirable flute formation properties. The caliper or thickness of the media is determined according to TAPPI Standard T 411-om-05 using a Thwing Albert 89-100 Thickness Tester. A suitable thickness for the disclosed filtration media is on average 6 mils (0.15 mm) to 15 mils (0.38 mm), and preferably about 10 mils (0.25 mm) to 12 mils (0.30 mm).

The filtration media is also constructed to have a relatively low basis weight. The basis weight is measured according to TAPPI Standard T 410-om-02. A suitable basis weight of the media may be between 31 and 49 pounds per 3,000 square feet (lbs/3000 ft$^2$) (51-80 g/m$^2$), preferably between 35 and 45 lbs/3000 ft$^2$ (57-73 g/m$^2$) and more preferably between 39 and 43 lbs/3000 ft$^2$ (63-70 g/m$^2$). The basis weight of the media after it has been fully cured decreases approximately 2 to 4 lbs/3000 ft$^2$ (3,3-6.5 g/m$^2$).

In order to provide a relatively low resistance to air flow, it is desirable that the filtration media have a relatively high air permeability (or "air perm"). The air perm of the media is measured according to TAPPI Standard T 251 cm-85 ("Air Permeability of Porous Paper, Fabric and Pulp Handsheets") with 0.5 inch (12.7 mm) water differential, which measures the rate of the flow of air in cubic feet per square foot of sample area per minute. Air perm may also be referred to as porosity, Frazier or Textest. It is desirable for the filtration media to have an air perm of at least 25 cubic feet per minute per square foot (cfm/sf) (127 l/m$^2$ s).

The filtration media is also constructed to have relatively high tear strength to withstand tears that may occur as a result of vibrations during use in a filter element. Tear strength of the media is determined according to TAPPI Standard T 414 om-04 ("Internal Tearing Resistance of Paper; Elmendorf-Type Method") using an Elmendorf Tearing Tester (Thwing-Albert Instrument Co., Philadelphia, PA) with a 100 gram pendulum. Higher values represent stronger substrates. The filtration media should have a tear strength in the machine direction (MD) of at least 50 grams-force (490 mN) per 16-ply and a tear strength in the cross direction (CD) of at least 60 grams-force (590 mN) per 16-ply and, preferably more than 65 grams-force (640 mN) per 16-ply in the MD and more than 85 grams-force (830 mN) per 16-ply in the CD.

The fiber composition and processing parameters are selected to provide a filtration media that is thin, as described above, but is not compact. It is desirable to have open spaces or pores in the media of sufficient size to permit fluid flow through the media, but not to degrade the filtration media's dust holding capacity. The size of the pores in the media is determined using a bubble point method according to ASTM 316-03 (2011). The test is based on the fact that the pressure required to force an air bubble through a pore is inversely proportional to the size of the hole. The filter media is placed in contact with liquid on the upper surface and air beneath. Air pressure is gradually increased until it is high enough for bubbles to be seen on the liquid side. The pressure at which the bubbles begin to flow determines the largest pore size, as well as location. The maximum pore size in the media (or "Max Pore") may be between 43 microns and 63 microns. The average pore size (or "Mean Flow Pore") is based on comparison of the gas pressure, either air or nitrogen, through a dry sample to that of one wetted with mineral oil also according to ASTM 316-03 (2011). A suitable MFP is between 10 microns (μm) and 20 microns.

It is desirable for a filtration element containing the filtration media of this disclosure that has been pleated and/or fluted to have a pressure drop of less than 350 Pa for dust loading of 30 mg/cm$^2$ when testing with SAE fine dust (ISO 12103-1 A2 Fine Test Dust from Powder Technologies, Inc.) at a concentration of 200 mg/m$^3$ and a face velocity of 5 cm/sec. The pressure drop across the filtration media is measured using a Palas MFP-30000 Filter Test System (Palas GmbH, Karlsruhe, Germany) connected to a RBG 1000 dust feeder. The filtration media by itself should have a pressure drop of less than 1000 Pa for dust loading of 1.5 mg/cm$^2$ when testing a flat single layer of the media having a 100 cm$^2$ sample area with SAE fine dust (ISO 1213-1A2 Fine Test Dust from Powder Technologies, Inc.) at a concentration of 150 mg/m$^3$ and a face velocity of 20 cm/sec.

It is also desirable for the filtration media to have removal efficiency of no less than 20 percent for 0.78 micron (μm) latex particles at a face velocity of 20 feet/minute (6.1 m/min) when tested according to ASTM-1215-89.

The filtration media comprises a blend of fibers having a weight percent of 81 wt % to 87 wt % of a weight of the media and a resin binder having a weight percent of 13 wt % to 19 wt % (preferably about 16 wt %) of the weight of the media. The resin binder preferably comprises a phenolic resin binder with a crosslinking agent, such as a methanol soluble resole phenolic or methylated melamine formaldehyde. Other suitable resins include epoxies, novalac, acrylic, styrene acrylic, vinylacrylic, ethylenevinylchloride, polyvinylacetate, urea formaldehyde, ethylenevinylacetate, polyvinylalchohol, DMDHEU (dimethylol dihydroxyethyleneurea) and isocyanate.

The blend of fibers comprises cellulose fibers having a weight percent of about 82.5 wt % to about 96 wt % of the weight of the blend of fibers and synthetic fibers having a weight percent of about 4 wt % to about 17.5 wt % of the weight of the blend of fibers.

The cellulose fiber component of the blend of fibers comprises a blend of hardwood and softwood pulp. The hardwood pulp has a weight percent of about 13 wt % to about 41 wt % of the weight of the filtration media, and is preferably Eucalyptus. Other suitable hardwood pulps include aspen, birch, poplar, oak and maple.

The softwood pulp in the filtration media has a weight percent of about 32 wt % to about 66 wt % by weight of the media. Suitable softwood pulp is derived from the wood of pine, cedar, alpine fir, douglas fir and spruce trees, but preferably is slash pine or loblolly pine. The softwood pulp is generally mechanically or chemically treated to achieve a high level of fibrillation or curling to provide high air permeability and high capacity properties to the filtration media. Treated softwood cellulose pulp provides a more open lofty web structure than untreated cellulose fibers because it does not pack down as much during web formation, and permits production of a thin web during refining while retaining an open structure and high permeability of at least 25 cfm (127 l/m² s). A suitable softwood pulp is of a type that when formed into a 60 pounds per 3,000 square feet (97.7 g/m²) handsheet with a caliper of less than 26 mils (0.66 mm), preferably less than 23 mils (0.58 mm), the handsheet has an air permeability of 100-175 cubic feet per minute (cfm) (508-889 l/m² s). It is preferred that the handsheet has a minimum caliper of 16 mils (0.41 mm). The handsheet is prepared according to a modified version of TAPPI Standard T 205 om-88 ("Forming Handsheets for Physical Tests of Pulp") by disintegrating 6.4 grams of bone dry softwood pulp in 2000 milliliters of water to achieve a slurry with 0.32% solids consistency. The slurry is processed in a disintegrator for 5 minutes at 300 revolutions per minutes (rpm), and put into a sheet mold to form a handsheet that is 60 pounds per 3,000 square feet (97.7 g/m²). The caliper of the handsheet is determined according to TAPPI Standard T 411-om-05 as set forth above. An example of a type of softwood cellulose pulp suitable for use in the filtration media of this disclosure is a bulk-dried southern bleached softwood kraft (SBSK) pulp made from essentially 100% Slash Pine fibers, available from Buckeye Technologies, Memphis, Tennessee as Grade FHP-11.

Synthetic fibers are incorporated into the blend of fibers to provide strength and tear resistance properties. Preferred synthetic fibers are polyester fibers (e.g., polyethylene terephthalate or PET) having a linear density of 1 to 3 denier (i.e., the weight in grams of 9,000 meters of fiber), preferably 1.5 denier, and a length of ¼ to ½ inch (6.35-12.7 mm), preferably ⅜ inch (9.53 mm). Other suitable synthetic fibers include polyamide, polybutylene terephthalate, polypropylene, polyethylene.

A wet-laid process is employed to form a wet web of a desired fiber composition for further processing that may include heating, cooling, application of a resin formulation and curing. In the process, a fiber furnish is prepared by filling a hydropulper with warm water, agitating the water, adding a blend of hardwood and softwood cellulose fibers and synthetic fibers, and further agitating the mixture for approximately 2 to 20 minutes to mix and disperse the fibers, such that the fiber furnish has a consistency of approximately 3.5% solids. The fiber furnish preferably comprises 80 wt % to 95 wt % cellulose fibers and 5 wt % to 20 wt % synthetic fibers, preferably 10 wt %. The cellulose fiber content in the fiber furnish is preferably 50 wt % to 80 wt % softwood pulp and 20 wt % to 50 wt % hardwood pulp.

The fiber furnish is sent to refiners, such as disk and conical refiners, where the fibers are mechanically abraded to induce fibrillation and to reduce the caliper of the web formed from the furnish. Even after refining, the softwood pulp retains an open structure and therefore provides a high capacity filter media with high air permeability. The energy applied in the refiners varies based upon the desired level of fibrillation and permeability.

The fiber furnish is diluted with water to a desired consistency ranging from about 0.05 to 0.2% depending upon the type of paper machine forming technology that is used, to form a fiber slurry and applied to a wire forming line on a web-forming machine by spraying or otherwise to form a web or sheet. The web or sheet may be produced by any conventional wet-laid paper machines, including those having forming sections selected from the group consisting of inclined wire, flat fourdrinier wire and rotoformer. Water is removed from the web or sheet by vacuum slots placed along the length of the wire forming line, such that the water content of the web as it comes off the wire is about 75%, i.e., the solids content is approximately 25%.

After the web is formed from the fiber blend and dewatered, the formed web is dried by any known means such as dyer cans, steam cylinders or through air driers to further remove until the moisture content is about 1-2%. The dried web may then be wound up on a reel for storage or further processing. Alternatively, further processing may be set up in-line with the web formation machinery.

The web is then unwound from the reel and saturated with the resin binder formulation. A saturating size press or other conventional means may be used to apply the resin formulation, such as curtain coaters, metered press coater, foam bonders, gravure rolls, dip and nip, doctored transfer rolls, rod coaters, and spray coaters. In general, the size press or coater will create hydraulic pressure that presses the resin formulation into the web.

Preferred resin formulations include a phenolic resin binder with a cross-linking agent, such as methanol soluble resole phenolic or methylated melamine formaldehyde, dispersed in a carrier of methanol or other type of liquid solvent or dispersant. The resin formulation may include a small amount of water, but not as a carrier. The resin formulation has a solids content of about 18%, but resin formulations having solids contents between 12% and 30% are also be suitable to achieve the desired properties. Flame retardants, such as phosphorous, nitrogen, and halogen compounds, or combinations thereof, may be added to the resin formulation if flame and/or fire retardant properties are desired. Water-repellant compounds, such as fluorocarbons and wax, may also be added to resin formulation if repellency properties are desired.

The resin formulation may be applied as an add-on to the web in an amount equal to about 9-15 grams per square meter. In the exemplary embodiments described below, about 12 grams per square meter of resin was applied. The resin should be applied in an amount that permits the final media to have a resin content of about 13 wt % to 19 wt % of the weight of the media. The total weight of the webs in this disclosure, including the resin binder formulation, will be about 31 to 49 lbs/3000 ft² (50-80 g/m²), preferably about 35-45 lbs/3000 ft² (56-73 g/m²), after curing.

The saturated web is dried at temperatures of about 190° F. to 220° F. (88-104° C.) to drive off the resin carrier and reduce the moisture content of the web to approximately 0.7%-1.5%. Any known means for drying a saturated fiber web may be used, including steam cans, through-air driers, or floatation ovens.

The resin is cured to a desired state of cure that is less than fully cured, such that web exhibits a wet Mullen ratio of between 60% and 80%, preferably between 60% and 75%, and more preferably 60%-70% (i.e., the wet Mullen ratio is used to measure the desired amount of cure). This permits a manufacturer of filter elements to further process the media, and complete the cure if necessary. Curing may be accomplished in a forced air oven, or other types of heating devices, such that the temperature of the web as it exits the curing station is between 300° F. and 350° F. (149-177° C.), preferably 305° F. to 335° F. (152-168° C.). Typical curing times to achieve the desired wet Mullen ratio in a media as described above are between about 6 to 10 seconds, and preferably 7-8 seconds.

The cured web may then be cooled by suitable cooling means to stop the reaction of the resin. The filtration media is completed by re-moisturized the web (e.g., with a fine water spray) to stabilize the web structure and improve subsequent processing, such that the moisture content of the finished web is less than 5% (3 grams/square meter).

Employing the blend of fibers and processing parameters described above permits tuning filtration media to the desired wet Mullen cure ratio while retaining the desired properties for filtration applications, including providing a thin, light weight media with good tear resistance, air permeability and air filtration properties, and that is flexible, but strong enough to retain a fluted or other structure when wound in a roll. Table I shows the composition and physical properties of 4 examples of filtration media produced in accordance with the foregoing disclosure (samples 1A-C and 2) that exhibit the desired wet Mullen ratio, and 3 examples of filtration media that do not exhibit the desired wet Mullen ratio.

TABLE I

| Sample | 1A | 1B | 1C | 2 | 3 | 4 | 5 |
|---|---|---|---|---|---|---|---|
| Fiber Furnish Compositions (% of Furnish) | | | | | | | |
| Hardwood Pulp | 30 | 30 | 30 | 30 | 30 | 30 | 30 |
| Softwood Pulp | 60 | 60 | 60 | 60 | 70 | 70 | 60 |
| Polyester | 10 | 10 | 10 | 10 | 0 | 0 | 10 |
| Resin Add-On (% of finished media weight) | | | | | | | |
| Phenolic | 19.43 | 16.83 | 11.43 | 13.65 | 16.11 | 15.72 | 15.64 |
| Physical Properties | | | | | | | |
| Basis Wt. (SD) (lbs/3000 ft$^2$) | 43.08 | 42.6 | 39.4 | 40.64 | 41.71 | 41.41 | 41.5 |
| Basis Wt. (SDC) (lbs/3000 ft$^2$) | 39.98 | 38.4 | 35.72 | 38.7 | 39.73 | 39.52 | 39.76 |
| Caliper (mils) | 11.34 | 10.88 | 9.98 | 10.24 | 10.09 | 10.15 | 9.92 |
| Density (SD) (lbs/ft$^3$) | 15.20 | 15.66 | 15.79 | 15.88 | 16.54 | 16.32 | 16.73 |
| Density (SDC) (lbs/ft$^3$) | 14.10 | 14.12 | 14.32 | 15.12 | 15.75 | 15.57 | 16.03 |
| Wet Mullen Ratio (% Cure) | 67.85 | 73.11 | 75.46 | 61.23 | 40.98 | 40 | 31.06 |
| Air Perm (cfm/sf) | 28 | 32 | 28.2 | 29.5 | 28.6 | 28.4 | 27.1 |
| MD Tear Resistance (g) | 68 | 73 | 80 | | 84 | 80 | 80 |
| CD Tear Resistance (g) | 88 | 85 | 96 | | 80 | 80 | 96 |
| Stiffness - Gurley (SD) (mg) | 600 | 800 | 533 | | 450 | 450 | 400 |
| Stiffness/Density (cm$^3$) | 2.46 | 3.1 | 2.10 | | 1.698 | 1.721 | 1.493 |
| Mean Flow Pore (microns) | 13.9 | 16.8 | 14.5 | 16.9 | 13.3 | 13.8 | 14 |

TABLE I

| | (SI units) | | | | | | |
|---|---|---|---|---|---|---|---|
| Sample | 1A | 1B | 1C | 2 | 3 | 4 | 5 |
| Fiber Furnish Compositions (wt % of Furnish) | | | | | | | |
| Hardwood Pulp | 30 | 30 | 30 | 30 | 30 | 30 | 30 |
| Softwood Pulp | 60 | 60 | 60 | 60 | 70 | 70 | 60 |
| Polyester | 10 | 10 | 10 | 10 | 0 | 0 | 10 |
| Resin Add-On (wt % of finished media weight) | | | | | | | |
| Phenolic | 19.43 | 16.83 | 11.43 | 13.65 | 16.11 | 15.72 | 15.64 |
| Physical Properties | | | | | | | |
| Basis Wt. (SD) g/m$^2$ | 70.11 | 69.33 | 64.12 | 66.14 | 67.88 | 67.39 | 67.54 |
| Basis Wt. (SDC) g/m$^2$ | 65.07 | 62.50 | 58.13 | 62.98 | 64.66 | 64.32 | 64.71 |
| Caliper (mm) | 0.288 | 0.276 | 0.253 | 0.260 | 0.256 | 0.258 | 0.252 |

TABLE I-continued

| | (SI units) | | | | | | |
|---|---|---|---|---|---|---|---|
| Sample | 1A | 1B | 1C | 2 | 3 | 4 | 5 |
| Density (SD) (kg/m$^3$) | 243.48 | 250.85 | 252.93 | 254.37 | 264.95 | 261.42 | 267.99 |
| Density (SDC) (kg/m$^3$) | 225.86 | 226.18 | 229.38 | 242.20 | 252.29 | 247.41 | 256.78 |
| Wet Mullen Ratio (% Cure) | 67.85 | 73.11 | 75.46 | 61.23 | 40.98 | 40 | 31.06 |
| Air Perm ((l/m$^2$s) | 142 | 163 | 143 | 150 | 145 | 144 | 138 |
| MD Tear Resistance (g) | 68 | 73 | 80 | | 84 | 80 | 80 |
| CD Tear Resistance (g) | 88 | 85 | 96 | | 80 | 80 | 96 |
| Stiffness - Gurley (SD) (mg) | 600 | 800 | 533 | | 450 | 450 | 400 |
| Stiffness/Density (cm$^3$) | 2.464 | 3.189 | 2.107 | | 1.698 | 1.721 | 1.493 |
| Mean Flow Pore (microns) | 13.9 | 16.8 | 14.5 | 16.9 | 13.3 | 13.8 | 14 |

The physical properties set forth in Table I were measured using the test methods described above. The term "SD" in Table I refers to the filtration media after it is saturated and dried to the desired cure level (i.e., partially cured). The term "SDC" refers to the filtration media after it has been fully cured by heating it an oven for an additional 5 minutes at a temperature of 350° F. (177° C.).

As shown in Table I, media produced in accordance with the present disclosure was made to have the desired wet Mullen ratio in the range of 60% to 80% (i.e., the desired state of cure) without sacrificing any of the filtration or strength properties of the media. The wet Mullen ratios of Samples 3-5 were below the desired state of cure and resulted in the media's stiffness being too low for further processing and use in fluted media applications.

The ratio of the media's stiffness (mg) to density (lb/ft$^3$) is another indication of the improved flexibility achieved by the disclosed filtration media having a wet Mullen ratio in the range of 60% to 80%, which permits it to be flexible enough for processing in fluted media applications but strong enough to retain a fluted structure and permit further processing. The ratio of stiffness to density for the partially cured media (SD) was calculated and divided by a factor of 15.4 to simplify to SI units of cm$^3$. The stiffness of the as formed/partially cured (SD) media was determined by its resistance to bending according to modified TAPPI Standard T 543 om-05 ("Bending resistance of paper (Gurley-type tester)"). Samples were cut 3.5" (88.9 mm) in the machine direction by 2" (50.8 mm) in the cross direction, then clamped in the Gurley stiffness tester (Model No. 4171E) and tested using a 25 g weight that is 4" (101.6 mm) from the pivot center. Data reported are averages of three samples. The density was calculated by dividing the basis weight by the caliper and multiplying by 4.

The above disclosure, embodiments and examples are illustrative only and should not be interpreted as limiting. Modifications and other embodiments will be apparent to those skilled in the art, and all such modifications and other embodiments are intended to be within the scope of the present invention as defined by the claims.

We claim:

1. A filtration media comprising a blend of fibers having a weight percent of 81 wt % to 87 wt % of a weight of the media and a resin binder having a weight percent of 13 wt % to 19 wt % of the weight of the media, the media having a caliper of 6-15 mils (0.15-0.38 mm), a density of 14.1 to 16.03 lbs/ft$^3$, a maximum pore size of 43 to 63 microns, and a wet Mullen ratio of 60% to 80%, the blend of fibers comprising softwood pulp in an amount of about 32 wt % to about 66 wt % by weight of the media and a synthetic fiber component, wherein the softwood pulp comprises bulk dried southern bleached softwood craft pulp, wherein the synthetic fiber component comprises polyester fibers having a denier of 1 to 3 and a length of ¼ ½ inch.

2. The filtration media of claim 1, wherein the blend of fibers comprises a cellulose fiber component having a weight of about 82.5 wt % to about 96 wt % of the weight of the blend of fibers and the synthetic fiber component having a weight percent of about 4 wt % to about 17.5 wt % of the weight of the blend of fibers.

3. The filtration media of claim 2, wherein the cellulose fiber component further comprises hardwood pulp having a weight percent of about 13 wt % to about 41 wt % of the media.

4. The filtration media of claim 3, wherein the hardwood pulp is *eucalyptus*.

5. The filtration media of claim 1, wherein the media has a wet Mullen ratio of 60-75%.

6. The filtration media of claim 1, wherein the resin comprises a phenolic resin binder with a crosslinking agent.

7. The filtration media of claim 1, wherein the media has a tear resistance of at least 50 g (490 mN) per 16 ply in the machine direction and at least 60 g (590 mN) per 16 ply in the cross direction.

8. The filtration media of claim 1, wherein the caliper of the media is about 10 to 12 mils (0.25-0.30 mm).

9. The filtration media of claim 1, wherein a basis weight of the media is 35 to 45 pounds/3000 square feet (57-73 g/m$^2$).

10. The filtration media of claim 1, wherein the media has an air permeability of at least 25 cfm (127 l/m$^2$ s).

11. The filtration media of claim 1, wherein the media is pleated and/or fluted and has a pressure drop of less than 350 Pa for dust loading of 30 mg/cm$^2$ when testing with SAE fine dust at a concentration of 200 mg/m$^3$ and a face velocity of 5 cm/sec.

12. The filtration media of claim 1, wherein the media has a removal efficiency of at least 20% when measured in accordance with ASTM-125-89, where dust has been substituted for latex particles.

13. The filtration media of claim 1, wherein the media comprises pores having an average pore size between 10 and 20 microns.

14. The filtration media of claim 1, wherein the blend of fibers further comprises hardwood pulp having a weight percent of about 13 wt % to about 41 wt % of the weight of the media.

15. The filtration media of claim 1, wherein the filtration media has a pressure drop of less than 1000 Pa for dust loading of 1.5 mg/cm$^2$ when testing a flat single layer of the filtration media with SAE fine dust at a concentration of 150 mg/m$^3$ and a face velocity of 20 cm/sec.

16. The filtration media of claim 1, wherein the softwood pulp is of a type that a 60 pounds per 3,000 square feet (98 g/m$^2$) handsheet made exclusively from the softwood pulp has a caliper of 16-26 mils (0.41-0.66 mm) and an air permeability of 100-175 cfm (508-889 l/m$^2$ s).

* * * * *